(12) United States Patent
Vollenberg

(10) Patent No.: US 8,158,710 B2
(45) Date of Patent: Apr. 17, 2012

(54) POLYESTER BLENDS, METHODS OF MAKING, AND ARTICLES FORMED THEREFROM

(75) Inventor: Peter H. Vollenberg, Evansville, IN (US)

(73) Assignee: Sabic Innovative Plastics IP B.V. (NL)

(*) Notice: Subject to any disclaimer, the term of this patent is extended or adjusted under 35 U.S.C. 154(b) by 0 days.

(21) Appl. No.: 11/563,369

(22) Filed: Nov. 27, 2006

(65) Prior Publication Data
US 2008/0125551 A1 May 29, 2008

(51) Int. Cl.
*C08L 51/00* (2006.01)
(52) U.S. Cl. ......... 524/539; 524/413; 524/494; 524/495
(58) Field of Classification Search .................. 525/439; 524/539, 413, 494, 495
See application file for complete search history.

(56) References Cited

U.S. PATENT DOCUMENTS

| | | |
|---|---|---|
| 3,701,755 A | 10/1972 | Sumoto et al. |
| 3,766,146 A | 10/1973 | Witsiepe |
| 3,907,926 A | 9/1975 | Brown et al. |
| 3,953,394 A | 4/1976 | Fox et al. |
| 3,953,404 A | 4/1976 | Borman |
| 4,011,285 A | 3/1977 | Seymour et al. |
| 4,128,526 A | 12/1978 | Borman |
| 4,140,670 A | 2/1979 | Charles et al. |
| 4,157,325 A | 6/1979 | Charles et al. |
| 4,184,997 A | 1/1980 | Wu |
| 4,200,567 A | 4/1980 | Goldman et al. |
| 4,203,887 A | 5/1980 | Goedde et al. |
| 4,212,791 A | 7/1980 | Avery et al. |
| 4,337,192 A | 6/1982 | Campbell |
| 4,349,469 A | 9/1982 | Davis et al. |
| 4,355,155 A | 10/1982 | Nelsen |
| 4,469,851 A | 9/1984 | Charles et al. |
| 4,524,165 A | 6/1985 | Musser et al. |
| 4,579,884 A | 4/1986 | Liu |
| 4,598,117 A | 7/1986 | Liu et al. |
| 4,661,546 A | 4/1987 | Abu-Isa et al. |
| 4,664,983 A | 5/1987 | Nakamura et al. |
| 4,742,109 A * | 5/1988 | Takahashi et al. ............. 524/504 |
| 4,767,668 A | 8/1988 | Smith et al. |
| 4,845,169 A | 7/1989 | Abu-Isa et al. |
| 4,857,604 A | 8/1989 | Agarwal |
| 4,877,831 A | 10/1989 | Hongo et al. |
| 4,904,748 A | 2/1990 | Seymour et al. |
| 4,992,506 A | 2/1991 | McCormick et al. |
| 4,996,269 A | 2/1991 | Richeson et al. |
| 5,162,424 A | 11/1992 | de Boer et al. |
| 5,221,704 A | 6/1993 | Shimotsuma et al. |
| 5,266,601 A | 11/1993 | Kyber et al. |
| 5,304,594 A | 4/1994 | Saitou |
| 5,413,681 A | 5/1995 | Tustin et al. |
| 5,451,611 A | 9/1995 | Chilukuri et al. |
| 5,496,880 A | 3/1996 | Heuseveldt et al. |
| 5,541,244 A | 7/1996 | van der Meer et al. |
| 5,559,159 A | 9/1996 | Sublett et al. |
| 5,824,412 A | 10/1998 | Hausmann |
| 5,846,642 A | 12/1998 | Kimura et al. |
| 5,859,119 A | 1/1999 | Hoefflin |
| 5,981,661 A | 11/1999 | Liao et al. |
| 6,027,818 A | 2/2000 | McKenna |
| 6,087,591 A | 7/2000 | Nguyen |
| 6,162,837 A | 12/2000 | Gerking et al. |
| 6,448,343 B1 * | 9/2002 | Schombourg et al. ........ 525/288 |
| 6,518,322 B1 | 2/2003 | West |
| 6,849,684 B2 * | 2/2005 | Poppe et al. ................... 524/539 |
| 6,887,909 B2 | 5/2005 | Kawamura et al. |
| 6,927,275 B2 | 8/2005 | Hirokane et al. |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 2004/0034126 A1 * | 2/2004 | Garrison et al. ............. 523/400 |
| 2005/0137359 A1 | 6/2005 | Agarwal et al. |

(Continued)

FOREIGN PATENT DOCUMENTS

EP                0135493 A1     3/1985

(Continued)

OTHER PUBLICATIONS

R.F. Eaton Coating Crosslinking Reactions Using Cycloaliphatic Epoxides, Paint and Coting industry magazine, http://www.pcimag.com/Articles/Feature_Article/27f11cc2516a7010VgnVCM100000f932a8c02000), 2000.*
JP 53-140350; Date of Pub.: Dec. 7, 1978 (translation of abstract only).
JP 53-056252; Date of Pub.: May 22, 1978 (translation of abstract only).
JP 55-060553; Date of Pub.: May 7, 1980 (translation of abstract only).
JP 57-051738; Date of Pub.: Mar. 26, 1982 (translation of abstract only).
JP 58-141236; Date of Pub.: Aug. 22, 1983 (translation of abstract only).

(Continued)

*Primary Examiner* — Gregory Listvoyb
(74) *Attorney, Agent, or Firm* — Cantor Colburn LLP; Diderico van Eyl

(57) ABSTRACT

A composition, comprising a blend of 10 to 45 weight percent of a polyester selected from the group consisting of poly (ethylene terephthalate), poly(butylene terephthalate), poly (1,4-cyclohexyldimethylene cyclohexyl dicarboxylate), or a combination comprising at least one of the foregoing; and 55 to 90 weight percent of a poly(ester-ether)copolymer, each based on the total weight of the polyester and the poly(ester-ether)copolymer; wherein the poly(ester-ether)copolymer comprises units derived from terephthalic or a chemical equivalent thereof, units derived from butane diol or a chemical equivalent thereof, and 25 to 65 weight percent of units derived from poly(oxytetramethylene)glycol or a chemical equivalent thereof, based on the weight of the copolymer; wherein the composition retains at least 50% of at least one of tensile strength, modulus, stress at maximum strain, or the elongation at break is larger than 150% after being exposed to a temperature of 140° C. for 70 hours, as measured by ASTM D-638.

16 Claims, No Drawings

U.S. PATENT DOCUMENTS

| | | |
|---|---|---|
| 2008/0023887 A1 | 1/2008 | Vollenberg et al. |
| 2008/0125551 A1 | 5/2008 | Vollenberg |

FOREIGN PATENT DOCUMENTS

| | | |
|---|---|---|
| EP | 0 142 336 A1 | 5/1985 |
| EP | 0 237 306 A2 | 9/1987 |
| EP | 0 318 788 A2 | 6/1989 |
| EP | 0 320 651 A2 | 6/1989 |
| EP | 0 413 560 A2 | 2/1991 |
| EP | 0683201 A1 | 11/1995 |
| EP | 0 953 595 A1 | 11/1999 |
| GB | 1 431 916 | 4/1976 |
| GB | 1431916 | 4/1976 |
| GB | 1500577 A1 | 2/1978 |
| GB | 2 048 285 | 12/1980 |
| JP | 10158490 | 6/1998 |
| JP | 2000256472 | 9/2000 |
| JP | 2005089572 | 4/2005 |
| KR | 20010083551 | 9/2001 |
| WO | 83/01253 A1 | 4/1983 |
| WO | 92/07034 A2 | 4/1992 |
| WO | 96/35216 A1 | 11/1996 |
| WO | 00/40649 A1 | 7/2000 |
| WO | 03066704 | 8/2003 |

OTHER PUBLICATIONS

JP 58-142910; Date of Pub.: Aug. 25, 1983 (translation of abstract only).
JP 60-106854; Date of Pub.: Jun. 12, 1985 (translation of abstract only).
JP 60-127350; Date of Pub.: Jul. 8, 1985 (translation of abstract only).
JP 61-081454; Date of Pub.: Apr. 25, 1986 (translation of abstract only).
JP 62-004729; Date of Pub.: Jan. 10, 1987 (translation of abstract only).
JP 63-051454; Date of Pub.: Mar. 4, 1988 (translation of abstract only).
JP 63-120754; Date of Pub.: May 25, 1988 (translation of abstract only).
JP 63-238154; Date of Pub.: Oct. 4, 1988 (translation of abstract only).
JP 02-086646; Date of Pub.: Mar. 27, 1990 (translation of abstract only).
JP 02-173059; Date of Pub.: Jul. 4, 1990 (translation of abstract only).
JP 03-062848; Date of Pub.: Mar. 18, 1991 (translation of abstract only).
JP 03-121158; Date of Pub.: May 23, 1991 (translation of abstract only).
JP 03-252452; Date of Pub.: Nov. 11, 1991 (translation of abstract only).
JP 06-065492; Date of Pub.: Mar. 8, 1994 (translation of abstract only).
JP 06-240121; Date of Pub.: Aug. 30, 1994 (translation of abstract only).
JP 06-256630; Date of Pub.: Sep. 13, 1994 (translation of abstract only).
JP 06-313214; Date of Pub.: Nov. 8, 1994 (translation of abstract only).
JP 07-070300; Date of Pub.: Mar. 14, 1995 (translation of abstract only).
JP 07-138460; Date of Pub.: May 30, 1995 (translation of abstract only).
JP 08-0269311; Date of Pub.: Oct. 15, 1996 (translation of abstract only).
JP 09-003307; Date of Pub.: Jan. 7, 1997 (translation of abstract only).
JP 09-003309; Date of Pub.: Jan. 7, 1997 (translation of abstract only).
JP 09-040852; Date of Pub.: Feb. 10, 1997 (translation of abstract only).
JP 09-241364; Date of Pub.: Sep. 16, 1997 (translation of abstract only).
JP 10-087801; Date of Pub.: Apr. 7, 1998 (translation of abstract only).
JP 10-095907; Date of Pub.: Apr. 14, 1998 (translation of abstract only).
JP 11-106617; Date of Pub.: Apr. 20, 1999 (translation of abstract only).
JP 11-106625; Date of Pub.: Apr. 20, 1999 (translation of abstract only).
JP 11-323109; Date of Pub.: Nov. 26, 1999 (translation of abstract only).
JP 2000-072959; Date of Pub.: Mar. 7, 2000 (translation of abstract only).
JP 2000-159985; Date of Pub.: Jun. 13, 2000 (translation of abstract only).
JP 2000-191894; Date of Pub.: Jul. 11, 2000 (translation of abstract only).
JP 2000-239507; Date of Pub.: Sep. 5, 2000 (translation of abstract only).
JP 2000-327822; Date of Pub.: Nov. 28, 2000 (translation of abstract only).
JP 2001-072843; Date of Pub.: Mar. 21, 2001 (translation of abstract only).
JP 2001-205629; Date of Pub.: Jul. 31, 2001 (translation of abstract only).
JP 2001-247752; Date of Pub.: Sep. 11, 2001 (translation of abstract only).
JP 2002-003707; Date of Pub.: Jan. 9, 2002 (translation of abstract only).
JP 2002-0179801; Date of Pub.: Jun. 26, 2002 (translation of abstract only).
JP 2002-264213; Date of Pub.: Sep. 18, 2002 (translation of abstract only).
JP 2003-192778; Date of Pub.: Jul. 9, 2003 (translation of abstract only).
JP 2004-231929; Date of Pub.: Aug. 19, 2004 (translation of abstract only).
WO 2005/035657; Date of Pub.: Apr. 21, 2005 (translation of abstract only).
XP-002489158, JP 10158490, Jun. 16, 1998, English Abstract.
European Patent Office, International Search Report, International Application No. PCT/US2007/075898, Date of Mailing: Apr. 8, 2008.
European Patent Office, PCT Written Opinion, International Application No. PCT/US2007/075898, Date of Mailing: Apr. 8, 2008.
ASTM D 638 Standatd Test Method for Tensile Properties of Plastic; 15 pages; printed Jul. 25, 2007.

* cited by examiner

US 8,158,710 B2

POLYESTER BLENDS, METHODS OF MAKING, AND ARTICLES FORMED THEREFROM

BACKGROUND OF THE INVENTION

This disclosure relates to polyester compositions, and in particular to blends of polyesters with poly(ester-ether)copolymers, their methods of manufacture, and uses thereof.

Polyesters and polyester copolymers are well known thermoplastic polymers, and are useful for the manufacture of a wide variety of articles, from fibers to packaging. Poly(ester-ether)copolymers contain "hard blocks" (derived from the polyester units) and "soft blocks" (derived from the polyether units) that provide the polymer with elastomeric properties. Poly(ester-ether)copolymers are also thermoplastic, and thus processable by blow molding and injection molding. They have a number of advantageous properties, such as good resilience, low creep, resistance to impact, flex-fatigue resistance, and resistance to fuels, oils, and other organic solvents.

The properties of these materials can be modified by combining them with other polymers. Poly(ester-ether)copolymers often have relatively limited heat stability. In some applications, such as structural parts for automobiles, improved heat stability in combination with high notched Izod impact strength at low temperature is highly desirable. A number of blends of poly(ester-ether)copolymers with other polymer(s) have been described, for example in U.S. Pat. No. 4,904,748, GB 1431916 A, JP 09003309 A, WO 96/34055 A, WO 86/03049A, U.S. Pat. No. 5,541,244, U.S. Pat. No. 3,907,926, JP 11106617 A, and JP 58141236A. However these references do not have sufficient detail to disclose or teach one of ordinary skill in the art how to make compositions imparting sufficiently improved heat stability, particularly in combination with low temperature ductility properties. There accordingly remains a need in the art for thermoplastic compositions and articles based on poly(ester-ether)copolymers that are heat stable. It would further be advantageous if such compositions had high notched Izod impact strength at low temperature.

SUMMARY OF THE INVENTION

The above-described and other deficiencies of the art are met by a thermoplastic composition comprising a blend of 10 to 45 weight percent of a polyester selected from the group consisting of poly(ethylene terephthalate), poly(butylene terephthalate), poly(1,4-cyclohexyldimethylene cyclohexyl dicarboxylate), or a combination comprising at least one of the foregoing; and 55 to 90 weight percent of a poly(ester-ether)copolymer, each based on the total weight of the polyester and the poly(ester-ether)copolymer; wherein the poly(ester-ether)copolymer comprises units derived from terephthalic or a chemical equivalent thereof, units derived from butane diol or a chemical equivalent thereof, and 25 to 65 weight percent of units derived from poly(oxytetramethylene)glycol or a chemical equivalent thereof, based on the weight of the copolymer; wherein the composition retains at least 50% of at least one of tensile strength, modulus, stress at maximum strain, or the elongation at break is larger than 150% after being exposed to a temperature of 140° C. for 70 hours, as measured by ASTM D-638.

In another embodiment, a composition comprises a blend of 10 to 45 weight percent of a poly(butylene terephthalate), 55 to 90 weight percent of a poly(ester-ether)copolymer, each based on the total weight of the poly(butylene terephthalate) and the poly(ester-ether)copolymer; wherein the poly(ester-ether)copolymer comprises units derived from terephthalic acid or a chemical equivalent thereof, units derived from butane diol or a chemical equivalent thereof, and 25 to 55 weight percent of units derived from poly(oxytetramethylene)glycol or a chemical equivalent thereof, based on the weight of the copolymer; 0.01 to 5 weight percent, based on the total weight of the composition, of beta-(3,4-epoxycyclohexyl)ethyl triethoxysilane, a polymer of epoxy resin and bisphenol A; an antioxidant stabilizer composition comprising a hindered diol stabilizer, a thioester stabilizer, an amine stabilizer, a phosphite stabilizer, or a combination comprising at least one of the foregoing stabilizers; and wherein the composition retains at least 50% of at least one of tensile strength, modulus, stress at maximum strain, or the elongation at break is at least 150% after being exposed to a temperature of 153° C. for 70 hours, as determined by ASTM D-638.

In yet another embodiment, a composition comprises a blend of 20 to 30 weight percent of a poly(butylene terephthalate), 70 to 80 weight percent of a poly(ester-ether)copolymer, each based on the total weight of the poly(butylene terephthalate) and the poly(ester-ether)copolymer; wherein the poly(ester-ether)copolymer comprises units derived from terephthalic acid or a chemical equivalent thereof, units derived from butane diol or a chemical equivalent thereof, and 30 to 55 weight percent of units derived from poly(oxytetramethylene)glycol or a chemical equivalent thereof, based on the weight of the copolymer; an antioxidant stabilizer composition comprising a hindered diol stabilizer, a thioester stabilizer, an amine stabilizer, a phosphite stabilizer, or a combination comprising at least one of the foregoing stabilizers; 0.01 to 5 weight percent, based on the total weight of the composition, of beta-(3,4-epoxycyclohexyl)ethyl triethoxysilane, a polymer of epoxy resin and bisphenol A, or a combination comprising at least one of the foregoing compounds; wherein the composition retains at least 50% of at least one of tensile strength, modulus, stress at maximum strain, or shows an elongation at break larger than 150% after being exposed to a temperature of 153° C. for 70 hours, as determined by ASTM D-638, and wherein the composition further exhibits a low temperature Notched Izod ductility of at least 80% at −40° C., as measured by ASTM D256.

In still another embodiment, a composition comprises a blend of 10 to 35 weight percent of a poly(1,4-cyclohexyldimethylene cyclohexyl dicarboxylate), 65 to 90 weight percent of a poly(ester-ether)copolymer, each based on the total weight of the poly(1,4-cyclohexyldimethylene cyclohexyl dicarboxylate) and the poly(ester-ether)copolymer; wherein the poly(ester-ether)copolymer comprises units derived from terephthalic and isophthalic acid or chemical equivalents thereof, wherein the isophthalate is present in an amount of greater than 5 mole % of the isophthalate and terephthalate units in the poly(ester-ether)copolymer, units derived from butane diol or a chemical equivalent thereof, and 25 to 65 weight percent of units derived from poly(oxytetramethylene)glycol or a chemical equivalent thereof, based on the weight of the copolymer; and an antioxidant stabilizer composition consisting essentially of a hindered diol stabilizer, a thioester stabilizer, an amine stabilizer, a phosphite stabilizer, or a combination comprising at least one of the foregoing stabilizers; and wherein the composition retains at least 50% of at least one of tensile strength, modulus, stress at maximum strain, or shows an elongation at break larger than 150% after being exposed to a temperature of 140° C. for 70 hours, as determined by ASTM D-638

In another embodiment, an article comprises one of the above-described compositions.

In yet another embodiment, a method of forming a composition comprises melt blending the above-described components.

In still another embodiment, a method of forming an article comprises shaping, extruding, blow molding, or injection molding one of the above-described compositions to form the article.

The above described and other features are exemplified by the following detailed description.

DETAILED DESCRIPTION OF THE INVENTION

Surprisingly, it has now been found that a thermoplastic composition with improved aging properties, in particular heat aging can be obtained using a blend comprising a polyester and a poly(ester-ether)copolymer, optionally a carboxy reactive component, and optionally an additive such as antioxidant stabilizer. Moreover, it has also been found that the blends can unexpectedly maintain the low temperature notched Izod impact properties compared to the poly(ester-ether)copolymer alone. The compositions are useful in the manufacture of a wide variety of articles, particularly automotive parts.

As used herein, the term "combination" is inclusive of blends, mixtures, alloys, reaction products, and the like. The singular forms "a," "an," and "the" include plural referents unless the context clearly dictates otherwise. All cited references are incorporated herein by reference.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations.

A wide variety of polyesters can be used in the thermoplastic compositions. Exemplary polyesters comprise structural units of the following formula:

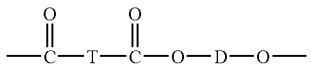

wherein each T is independently a divalent $C_1$-$C_{20}$ aliphatic radical, a divalent $C_3$-$C_{12}$ cycloaliphatic radical, or a divalent $C_6$-$C_{24}$ aromatic radical, each derived from a dicarboxylic acid or a chemical equivalent thereof; and each D is independently a divalent $C_1$-$C_{20}$ aliphatic radical, a divalent $C_3$-$C_{12}$ cycloaliphatic radical, a $C_6$-$C_{24}$ aromatic radical, each derived from a diol or a chemical equivalent thereof. Copolyesters containing a combination comprising at least one of the foregoing types of T and/or D radicals can be used. The polyesters can be branched or linear.

Examples of aromatic dicarboxylic acids that can be used to prepare the polyesters include isophthalic acid, terephthalic acid, 1,2-di(p-carboxyphenyl)ethane, 4,4'-dicarboxydiphenyl ether, 4,4'-bisbenzoic acid, and combinations comprising at least one of the foregoing acids. Dicarboxylic acids containing fused rings can also be used, such as 1,4-, 1,5-, or 2,6-naphthalenedicarboxylic acids. Exemplary cycloaliphatic dicarboxylic acids include decahydronaphthalene dicarboxylic acids, norbornene dicarboxylic acids, bicyclooctane dicarboxylic acids, 1,4-cyclohexanedicarboxylic acid, and the like. Exemplary cycloaliphatic polyesters include 1,4-cyclohexane dicarboxylic acid (cis or trans), and the like. A specific dicarboxylic acid is a combination of isophthalic acid and terephthalic acid wherein the weight ratio of isophthalic acid to terephthalic acid is 91:9 to 2:98. Chemical equivalents of the diacids include the corresponding dialkyl esters, e.g., dimethyl esters, diaryl esters, anhydrides, salts, acid chlorides, and acid bromides.

Suitable $C_6$-$C_{12}$ aromatic diols include but are not limited to the diols of formula (2), for example resorcinol, hydroquinone, and pyrocatechol, as well as diols such as 1,5-naphthalene diol, 2,6-naphthalene diol, 1,4-napthalene diol, 4,4'-dihydroxybiphenyl, bis(4-hydroxyphenyl)ether, bis(4-hydroxyphenyl)sulfone, and the like, and combinations comprising at least one of the foregoing aromatic diols. Aliphatic and cycloaliphatic diols are more commonly used, for example 1,2-ethylene glycol, 1,2- and 1,3-propylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, and the like. Chemical equivalents of the diols include dialkylesters such as dimethyl esters, diaryl esters, and the like.

Another class of polyesters includes at least one cycloaliphatic moiety, for example poly(1,4-cyclohexylenedimethylene)terephthalate (PCT), poly(cyclohexane-1,4-dimethylene cyclohexane-1,4-dicarboxylate) (also referred to as poly(1,4-cyclohexane-dimethanol 1,4-dicarboxylate) (PCCD)), and poly(1,4-cyclohexylene dimethylene terephthalate-co-isophthalate) (PCTA).

Other useful polyesters are copolyesters derived from an aromatic dicarboxylic acid and a mixture of linear aliphatic diols (specifically ethylene glycol, butylene glycol, poly(ethylene glycol) or poly(butylene glycol)) together with cycloaliphatic diols such as 1,6-hexane diol, dimethanol decalin, dimethanol bicyclooctane, 1,4-cyclohexane dimethanol and its cis- and trans-isomers, 1,10-decane diol, and the like. The ester units comprising the linear aliphatic or cycloaliphatic ester units can be present in the polymer chain as individual units, or as blocks of the same type of units. A specific ester of this type is poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene.

It has been found compositions comprising PET, PBT, PCCD, or a combination comprising at least of the foregoing polyesters are of particular utility in obtaining compositions that have the desired heat stability, optionally in combination with low temperature ductility properties. In one embodiment, the compositions comprise a polymer component that consists essentially of PET, PBT, or PCCD, together with the below-described thermoplastic poly(ester-ether)copolymers. Such compositions have heat stability, optionally in combination with low temperature ductility properties. In another embodiment, the compositions comprise a polymer component that consists of PET, PBT, or PCCD, together with the below-described thermoplastic poly(ester-ether)copolymers. It is to be understood that carboxy-reactive materials as described below are not included as part of the "polymeric component."

The polyesters can be obtained by interfacial polymerization or melt-process condensation, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition. Recycled polyesters and blends of recycled polyesters with virgin polyesters can also be used.

Polyesters disclosed herein can have an intrinsic viscosity of 0.4 to 2.0 dl/g, measured in a 60:40 phenol/tetrachloroethane mixture or similar solvent at 23° C. to 30° C. The polyesters can have a weight average molecular weight of 20,000 to 200,000, specifically 50,000 to 150,000 as measured by gel permeation chromatography (GPC).

The thermoplastic compositions further comprise thermoplastic poly(ester-ether) ("TPEE") copolymers. The soft blocks in these copolymers provide the elastomeric properties. The hard blocks are crystallizable materials that provide the physical integrity, heat resistance and chemical resistance. The properties of TPEE copolymers are a function of the molecular structure of the soft blocks and the hard blocks, the molecular weights of these blocks, and the relative amounts of them present in the copolymer. The TPEE copolymer can be characterized by the glass transition temperature (Tg) of the soft block and the melting temperature (Tm) of the hard block. In general, the Tg of the soft block can be −25 to −85° C., specifically −45 to −65° C., and the Tm of the hard block can be 120 to 200° C., specifically 150 to 195° C.

TPEE copolymers accordingly comprise units derived from the reaction of a dicarboxylic acid component (or chemical equivalent thereof) with two types of diols (or chemical equivalent thereof), a short chain $C_{1-10}$ diol, and a poly(oxyalkylene)diol.

The dicarboxylic acid component can be one or more of the dicarboxylic acids described above in connection with the polyesters. In one embodiment, the dicarboxylic acid is aromatic, for example terephthalic acid, isophthalic acid, or a combination comprising at least one of the foregoing acids. In a specific embodiment, the dicarboxylic acid is terephthalic acid. In another embodiment, the dicarboxylic acid is a combination of terephthalic acid and isophthalic acid.

Suitable short chain diols include $C_{1-8}$ diols as described above in connection with the polyester. Specific diols are ethylene glycol and butane diol, even more specifically butane diol.

The poly(oxyalkylene)diol is derived from the polymerization of a $C_{1-6}$ diol or a combination comprising one or more $C_{1-6}$ diols, in particular $C_{2-4}$ diols, or the chemical equivalents thereof Poly(oxytetramethylene)glycol is preferred, and can be prepared by well known techniques. The poly(oxyalkylene)diol, in particular the poly(oxytetramethylene)glycol, has a weight average molecular weight (Mw) of 100 to 5,000, or more specifically, 150 to 4,000, or even more specifically, 200 to 3,000.

A specific TPEE copolymer is a poly(butylene terephthalate/isophthalate-oxytetramethylene)copolymer. The copolymer comprises 25 to 65 wt. %, more specifically 30 to 60 wt. %, even more specifically 25 to 55 wt. % of units derived from poly(oxytetramethylene)glycol or chemical equivalents thereof, based on the weight of the copolymer.

The poly(butylene terephthalate-oxytetramethylene)copolymer can further comprise isophthalic acid in addition to terephthalic acid. In one embodiment, the poly(butylene terephthalate/isophthalate-oxytetramethylene)copolymer comprises 0 to 40 mole % of units derived from isophthalic acid or a chemical equivalent thereof, based on the total number of isophthalate and terephthalate units. For example, the poly(butylene terephthalate/isophthalate-oxytetramethylene)copolymer can comprise less than 5 mole % of isophthalate units, specifically 0 to 5 mole % of isophthalate units, based on the total number of isophthalate and terephthalate units in the copolymer. In another embodiment, the poly(butylene terephthalate/isophthalate-oxytetramethylene)copolymer comprises greater than 5 mole % of isophthalate units, specifically 5 to 40 mole %, based on the total number of isophthalate and terephthalate units in the copolymer.

The poly(ester-ether)copolymer can be prepared by conventional techniques, as described, for example in U.S. Pat. No. 4,349,469. Up to 1.5 mol %, based on the acid or glycol component, of a polybasic acid or polyhydric alcohol branching agent having at least three COOH or OH functional groups and from 3 to 60 carbon atoms can be present to provide a branched copolymer. Esters of many such acids or polyols can also be used. Suitable branching agents include trimellitic acid or anhydride, trimesic acid, trimethylol ethane, trimethylol propane, and trimer acid.

A variety of poly(ester-ether)copolymers are commercially available, for example from DSM under the trade names ARNITEL EM400 and ARNITEL EL630; from Dupont under the trade names, HYTREL 4056, HYTREL 4556, and HYTREL 6356; and from Eastman Chemical under the trade name of ECDEL 9966. In all cases the soft block is derived from tetrahydrofuran. In HYTREL 4556, HYTREL 6356, ARNITEL EM400, and ARNITEL EL630, the hard block is PBT-based. In HYTREL 4056, the hard block contains isophthalate moieties in addition to the terephthalate units in the PBT blocks. In ECDEL 9966, the hard block is based on PCCD.

The composition can optionally comprise a carboxy reactive component. The carboxy reactive component can be a monofunctional or a polyfunctional carboxy reactive material that can be either polymeric or non-polymeric. Examples of carboxy reactive groups include epoxides, carbodiimides, orthoesters, oxazolines, oxiranes, aziridines, and anhydrides. The carboxy reactive component can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy reactive material and the polyester.

The term "polyfunctional" or "multifunctional" in connection with the carboxy reactive material means that at least two carboxy reactive groups are present in each molecule of the material. Particularly useful polyfunctional carboxy reactive materials include materials with at least two reactive epoxy groups. The polyfunctional epoxy material can contain aromatic and/or aliphatic residues. Examples include epoxy novolac resins, cycloaliphatic epoxy resins, the reaction product of epoxidized vegetable (e.g., soybean, linseed) oils, epoxy resins based on bisphenol A, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least 10, for example, or greater than 15, or greater than 20. These polymeric materials generally have a molecular weight greater than 3000, specifically greater than 4000, and more specifically greater than 6000. These are commercially available for example from Johnson Polymer, LLC (now BASF) under the trade name of JONCRYL, more specifically, JONCRYL ADR 4368.

Another example of a carboxy reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate" includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

Other suitable materials with multiple epoxy groups are acrylic and/or polyolefin copolymers and oligomers containing glycidyl groups incorporated as side chains. Suitable epoxy-functional materials are available from Dow Chemical Company under the trade name DER332, DER661, and DER667; from Resolution Performance Products (now Hexion Performance Chemicals, Inc.) under the trade name EPON Resin 1001F, 1004F, 1005F, 1007F, and 1009F; from Shell Oil Corporation (now Hexion Performance Chemicals, Inc.) under the trade names EPON 826, 828, and 871; from Ciba-Giegy Corporation under the trade names CY-182 and CY-183; and from Dow Chemical Co. under the trade names ERL-4221 and ERL-4299. Johnson Polymer Co. (now owned by BASF) is a supplier of an epoxy functionalized material known as ADR 4368 and ADR 4300. A further example of a polyfunctional carboxy reactive material is a copolymer or terpolymer including units of ethylene and glycidyl methacrylate (GMA), sold by Arkema under the trade name of LOTADER. In one embodiment, the carboxy reactive material is a combination comprising a poly(ethylene-glycidyl methacrylate-co-methacrylate).

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid, the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

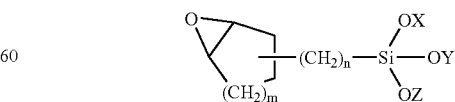

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl)ethyltriethoxysilane, available under the trade name CoatOSil 1770 from GE. Other examples are β-(3,4-epoxycyclohexyl)ethyltrimethoxysilane, available under the trade name Silquest A-186 from GE, and 3-glycidoxypropyltriethoxysilane, available under the trade name Silquest Y-15589 from GE. In one embodiment, the carboxy-reactive material is a combination comprising a poly(ethylene-glycidyl methacrylate-co-methacrylate) and a dicycloaliphatic diepoxy compound.

The type and amount of the carboxy reactive material will depend on the desired characteristics of the composition, the type of polyester used, the type and amount of other additives present in the composition, and like considerations, and is selected to provide the desired degree of aging stability, but without significantly adversely affecting other desired properties of the thermoplastic composition. In one embodiment, the amount of the carboxy reactive material is 0.01 to 5 wt. %, specifically 0.1 to 2 wt. %, or even more specifically 0.05 to 1 wt. %, based on the total weight of the composition.

In one embodiment, a catalyst can optionally be used to catalyze the reaction between the carboxy reactive material and the polyester. If present, the catalyst can be a hydroxide, hydride, amide, carbonate, borate, phosphate, $C_{2-36}$ carboxylate, $C_{2-18}$ enolate, or a $C_{2-36}$ dicarboxylate of an alkali metal such as sodium, potassium, lithium, or cesium, of an alkaline earth metal such as calcium, magnesium, or barium or other metal such as zinc or a lanthanum metal; a Lewis catalyst such as a tin or titanium compound; a nitrogen-containing compound such as a quaternary ammonium halide (e.g., dodecyltrimethylammonium bromide), or other ammonium salt, including a $C_{1-36}$ tetraalkyl ammonium hydroxide or acetate; a $C_{1-36}$ tetraalkyl phosphonium hydroxide or acetate; or an alkali or alkaline earth metal salt of a negatively charged polymer. Mixtures comprising at least one of the foregoing catalysts can be used, for example a combination of a Lewis acid catalyst and one of the other foregoing catalysts.

The type and amount of the catalyst will depend on the desired characteristics of the composition, the type of polyester used, the type and amount of the carboxy reactive material, the type and amount of other additives present in the composition, and like considerations, and is generally at least 1 ppm based on the total weight of the composition. In one embodiment, the amount of the catalyst is present in an amount of 1 ppm to 0.10 wt. %, based on the total weight of the composition.

The thermoplastic composition can optionally further comprise any of the additives and property modifiers that polyesters are usually combined with, with the proviso that the additives are selected so as to not significantly adversely affect the desired properties of the composition, for example, heat resistance. Exemplary additives include, for example, antioxidants, flame retardants, heat stabilizers, light stabilizers, plasticizers, lubricants, antistatic agents, colorants, mold release agents, and/or fillers such as glass, clay, mica, and the like. Other polymers can also be blended into the composition, in amounts of up to about 50 wt. % of the total weight of the compositions. Examples of polymers that can be blended to make polymer blends are aromatic polycarbonates, polysulfones, polyethersulfones, and impact modifiers.

An antioxidant stabilizer composition can be used, for example a composition comprising a hindered diol stabilizer, a thioester stabilizer, an amine stabilizer, a phosphite stabilizer, or a combination comprising at least one of the foregoing type of stabilizers.

Suitable antioxidants are organophosphites such as tris(2,6-di-tert-butylphenyl)phosphite, tris(nonyl phenyl)phosphite, tris(2,4-di-t-butylphenyl)phosphite, bis(2,4-di-t-butylphenyl)pentacrythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, commercially available from Geigy Chemical Company as Irganox 1010; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate, pentaerythrityl-tetrakis(beta-lauryl thiopropionate) (available from Crompton Corporation under the trade name Seenox 412S), or the like; amides of beta-(3,5-di-tert-butyl-4-hydroxyphenyl)-propionic acid or the like; or combinations comprising at least one of the foregoing antioxidants.

One exemplary antioxidant composition comprises tetrakis(2,4-di-tert-butylphenyl) 4,4'-biphenylene diphosphonite, which is available under the trade name SANDOSTAB® P-EPQ, from Clariant. Tetrakis(2,4-di-tert-butylphenyl) 4,4'-biphenylene diphosphonite and phosphoric acid can also be used, in a weight ratio of 80:20 to 20:80, specifically 70:30 to 30:70 can also be used. The antioxidant composition can also consist essentially of, or consist of, tetrakis[methylene(3,5-di-tert-butyl-4-hydroxyhydrocinnamate)]methane and pentaerythrityl-tetrakis(beta-lauryl thiopropionate), in a weight ratio of 30:60 to 70:30, specifically 40:60 to 60:40.

When present, the antioxidants are be used in an amount of 0.0001 wt. % to 2 wt. %, more specifically 0.01 wt. % to 1.2 wt. %, based on the total weight of the thermoplastic composition.

The above thermoplastic compositions (or articles prepared therefrom) can exhibit a number of desirable properties, including improved heat aging. In some embodiments, the compositions have a combination of improved heat aging and low temperature impact ductility.

One or more of the forgoing properties are obtained using composition comprising 10 to 45 wt. % of the polyester and 55 to 90 wt. % poly(ester-ether). More specifically, the composition comprises 10 to 35 wt. % of the polyester and 65 to 90 wt. % of the poly(ester-ether), alternatively 25 to 45 wt. % of the polyester and 65 to 75 wt. % of the poly(ester ether), and even more specifically 10 to 20 wt. % of the polyester and 70 to 80 wt. % of the poly(ester-ether). Each of the foregoing amounts is based on the total weight of the polyester and the poly(ester-ether)copolymer.

In one embodiment, the composition comprises 10 to 35 wt. % of PBT and 55 to 90 wt. % poly(ester-ether). The composition can alternatively comprise 10 to 20 wt. % of PET and 70 to 80 wt. % of the poly(ester-ether). In another embodiment, the composition comprises 26 to 45 wt. % of PCCD and 55 to 74 wt. % of the poly(butylene terephthalate/isophthalate-oxytetramethylene)copolymer; wherein less than 5 mole % of isophthalate units is present. In yet another embodiment, the composition comprises 10 to 35 wt. % of PCCD and 65 to 90 wt. % of the poly(butylene terephthalate/isoplhthalate-oxytetramethylene)copolymer; wherein 5 to 40 mole % of isophthalate units is present.

The thermoplastic compositions have improved heat aging properties compared to compositions having the same components in different proportions, or without one or more of the components set forth above. Thus, articles molded from the thermoplastic compositions, in particular ASTM Type I tensile bars, retain at least 50% of at least one of tensile strength, modulus, stress at maximum strain, or shows an elongation at break larger than 150% after heat aging, for example at temperature of 140° C. for 70 hours, and/or at 153° C. for 70 hours.

Articles molded from some of the compositions, in particular ASTM Type tensile Izod bars, can further exhibit a low temperature notched Izod impact ductility of at least 80% at −40° C., when measured in accordance with ASTM D256-04. In another embodiment, articles molded from the compositions, in particular ASTM Type Izod bars, can further exhibit a low temperature notched Izod impact ductility of up to 100% at −40° C., when measured in accordance with ASTM D256-04. In some embodiments, articles comprising the thermoplastic compositions, in particular ASTM Type Izod bars, have a notched Izod percent ductility that differs from the value of the notched Izod percent ductility of the same composition without the polyester by no more than 10% of that value, when measured in accordance with ASTM D256 at −40° C. In other words, the notched Izod percent ductility of the same compositions are within 10% of notched Izod percent ductility of the same composition without the polyester.

Compositions having these low temperature impact properties include those wherein the polyester is PBT, wherein the amount of PBT is 20 to 30 weight percent, based on the total weight of the polyester and the poly(ester-ether)copolymer, and wherein the poly(ester-ether)copolymer comprises 30 to 55 weight percent of units derived from poly(oxytetramethylene)glycol, based on the weight of the copolymer.

Compositions having these low temperature impact properties also include those wherein the polyester is PET, wherein the PET is present in an amount of 10 to 20 weight percent, based on the total weight of the PET and the poly(ester-ether)copolymer, and wherein the poly(ester-ether)copolymer comprises 30 to 65 weight percent of units derived from poly(oxytetramethylene)glycol, based on the weight of the copolymer.

Other compositions having these low temperature impact properties include those wherein the polyester is PCCD, wherein the PCCD is present in an amount of 26 to 39 weight percent, based on the total weight of the polyester and the poly(ester-ether)copolymer, and wherein the poly(ester-ether)copolymer comprises 30 to 65 weight percent of units derived from poly(oxytetramethylene)glycol, based on the weight of the copolymer. Here, the poly(ester-ether)copolymer can further comprise units derived from isophthalic acid or a chemical equivalent thereof, in an amount of less than 5 mole percent of the total moles of terephthalate and isophthalate units in the poly(ester-ether)copolymer, specifically 0 to 5 mole percent.

Alternatively, the poly(ester-ether)copolymer can further comprise units derived from isophthalic acid or a chemical equivalent thereof, in an amount of more than 5 mole percent of the total moles of terephthalate and isophthalate units in the poly(ester-ether)copolymer, specifically 5 to 40 mole percent. In that case compositions having these low temperature impact properties include those wherein the polyester is PCCD, wherein the PCCD is present in an amount of 10 to 35 weight percent, based on the total weight of the polyester and the poly(ester-ether)copolymer, and wherein the poly(ester-ether)copolymer comprises 25 to 65 weight percent of units derived from poly(oxytetramethylene)glycol, based on the weight of the copolymer.

In some embodiments, the thermoplastic compositions have a Shore D of greater than or equal to 35, or more specifically, 35 to 75.

The thermoplastic compositions can be manufactured by methods generally available in the art, for example, melt blending in an extruder. In an embodiment, in one manner of proceeding, powdered polyester, poly(ester-ether)copolymer, any additional polymer, and optionally other additives are first blended, in a HENSCHEL-Mixer® high speed mixer. Other low shear processes including but not limited to hand mixing can also accomplish this blending. The blend is then fed into the throat of an extruder, e.g., a twin-screw extruder via a hopper. Alternatively, at least one of the components can be incorporated into the composition by feeding directly into the extruder at the throat and/or downstream through a side-stuffer. The polyester components can be pre-blended with the carboxy-reactive compound and optional catalyst, and then combined with other additives. The extruder is generally operated at a temperature higher than that necessary to cause the composition to flow, e.g., at a temperature of 160 to 270° C., specifically 180 to 260° C., more specifically 190 to 250° C., wherein the die temperature can be different. The extrudate is immediately quenched in a water batch and pelletized. The pellets, so prepared, when cutting the extrudate can be one-fourth inch long or less as desired. Such pellets can be used for subsequent molding, shaping, or forming.

The compositions can be formed, shaped or molded into articles using common thermoplastic processes such as film and sheet extrusion, injection molding, gas-assist injection molding, extrusion molding, compression molding, blow molding, and the like. Thermoplastic substrates can be molded using one of the above processes. Single or multiple layers of coatings can further be applied to the thermoplastic substrates to impart additional properties such as scratch resistance, ultraviolet light resistance, aesthetic appeal, lubricity, and biocompatibility. Coatings can be applied through standard application techniques such as rolling, spraying, dipping, brushing, or flow-coating.

Those skilled in the art will also appreciate that known surface modification processes such as to heat-setting, texturing, embossing, corona treatment, flame treatment, plasma treatment and vacuum deposition can further be applied to the above articles to alter surface appearances and impart additional functionalities to the articles.

The articles are useful in a variety of applications, for example, consumer goods, industrial hoses and tubing and automotive applications such as inboard and outboard CVJ (constant velocity joints) boots on front wheel drive vehicles, prop shaft boots, rear wheel drive boots, and air ducts. In addition, these articles can be used for such applications as wire, cable, hose and tube. They are further useful to impart a soft-touch feel on handles of tools and appliances.

The thermoplastic composition is further illustrated by the following non-limiting examples.

EXAMPLES

The materials and components in Tables 1A and 1B were used in the following examples. Commercially available thermoplastic polyether-ester (TPEE) elastomers are listed in Table 1A, and the remaining components are listed in Table 1B. Table 1A also contains the tradename, grade name, manufacturer, the Shore D value, the glass transition temperature, Tg, in degrees Centigrade (° C.), of the polyether component, the melt temperature of the polyester component, Tm, in ° C., as given on the datasheets of these particular grades by the manufacturers. Finally, Table 1A contains the composition as measured by NMR as described below. In the tables, PTHF stands for poly(oxytetramethylene)glycol, which constitutes the so-called soft blocks in these elastomers.

TABLE 1A

|  |  | Arnitel EM400 | Hytrel 4056 | Hytrel 4556 | Hytrel 6356 |
|---|---|---|---|---|---|
| Manufacturer |  | DSM | Dupont | Dupont | Dupont |
| Shore D |  | 35 | 40 | 45 | 63 |
| Tg | °C. | −60 | −50 | −45 | 0 |
| Tm | °C. | 195 | 150 | 193 | 211 |
| Co-Polyether, PTHF | wt % | 60 | 45 | 50 | 27 |
| Co-Polyether, PBT | wt % | 40 | 55 | 50 | 73 |
| Terephthalate vs Isophthalate in PBT | mol % | 100 | 78 | 100 | 100 |
| Isophthalate vs terephthalate in PBT | mol % | 0 | 22 | 0 | 0 |
| Degree of polymerization in PTHF | DP | 21 | 11 | 14 | 10 |
| Degree of polymerization in PBT | DP | 5 | 5 | 5 | 10 |

TABLE 1B

| Name | Description | Manufacturer |
|---|---|---|
| PBT-195 | Poly(butylene terephthalate), IV = 0.63-0.68 (VALOX 195) | GE Plastics |
| PBT-315 | Poly(butylene terephthalate), IV = 1.15-1.22 (VALOX 315) | GE Plastics |
| PET-1 | Poly(ethylene terephthalate), IV = 0.54-0.57 | Invista or Futura Polymers |
| PCCD-low IV | Low IV poly(1,4-cyclohexyldimethylene cyclohexyl dicarboxylate) IV = 0.82-0.92 | Eastman Chemical |
| PCCD-high IV | High IV poly(1,4-cyclohexyldimethylene cyclohexyl dicarboxylate) IV = 1.02-1.12 | Eastman Chemical |
| I-1010 | Tetrakis[methylene-(3,5-di-tert-butyl-4-hydroxyhydrocinnamate)methane] (IRGANOX 1010) | Ciba Specialty Chemicals |
| 412S | Pentaerythritol tetrakis (beta-lauryl thiopropionate) (SEENOX 412S) | Crompton |
| PEPQ | Tetrakis(2,4-di-tert-butylphenyl) 4,4'-biphenylene diphosphonite (SANDOSTAB PEPQ) | Clariant |
| Naugard 445 | Hindered amine antioxidant | Crompton |
| Ultranox 626 | Bis(2,4-di-tert-butylphenyl)pentaerythritol diphosphite |  |
| ADR 4368 | Styrene-acrylate copolymer with glycidyl groups | BASF |
| SILCROSS 17 | Carboxy reactive silane | GE Silicones |
| Epoxy silane | beta-(3,4-epoxycyclohexyl)ethyltriethoxysilane |  |
| Mold Release | Pentaerythritol tetrastearate |  |

The compositions were prepared by compounding on a Werner and Pfleider 27 mm twin screw extruder with vacuum vented co-rotating mixing screws. The temperature was set at 200° C. to 250° C. and the screw speed between 400 and 450 rpm. The extrudate was cooled through a water bath prior to pelletization. The typical output rate for this extruder was 50 pounds/hour (lbs/hr).

Weight average molecular weight ($M_w$) was determined via GPC.

Intrinsic Viscosity (IV) data were collected on a Viscotek relative viscometer Y501C equipped with an autosampler and two Microlab 500 series pumps. A sample of about 0.2 gram (g) was weighed on an analytical balance and dissolved in about 35 mL of 60/40 volume/volume (v/v) Phenol/TCE (1,1,2,2-tetrachloroethane) mixture. Each sample was measured twice and an average of the two measurements was recorded. A blank containing Phenol/TCE was run in the beginning of the series. At the end of the series, a phenol/TCE wash was run to clean the system.

Chemical compositions of the TPEE copolymers were determined via nuclear magnetic resonance (NMR) Spectroscopy using a 400 MHz NMR spectrometer. Samples were dissolved in $CDCl_3$/TFA-D (7:3 v/v) at a concentration of between 40 and 50 mg/ml.

A Zwick Duromatic Durometer was used to measure Shore D hardness of the TPEE copolymers. Measurements were taken based on timed imprints (5 seconds) on the molded parts.

Specific Gravity was determined in accordance with ASTM D 792.

Vicat softening temperature (VST) was measured according to the standard ISO 306 test method. The sample was subject to 10N and the heating rate for the test was 50° C./hour.

Tensile performance data were measured according to ASTM D638 for Low-Modulus materials, on ASTM Type I, dumbbell-shaped bars. The initial speed of the test was one inch per minute and after 50% strain the speed was increased to two inches per minute. The test was run until the sample breaks or until the extensometer reaches its extension limit of 300%. Tensile modulus, stress at maximum strain, and elongation at break are reported.

Heat aging was performed at the indicated temperature and time duration using tensile bars as the test specimen. Typically, three tensile bars were used to generate statistically relevant data. The tensile properties of the heat-aged samples (tensile modulus, stress at maximum strain, and elongation at break) were measured. If the tensile modulus, stress at maximum strain, and elongation at break were within 50% of the measured properties of the same, but un-heat aged material, the heat-aged test was considered a "pass". If the elongation at break could not be determined for the un-heat aged material because it reached the equipment extension limit of 300%, an elongation at break of 150% or higher for the heat aged sample was considered a pass.

Examples 1-2 and Comparative Examples A-B

The heat aging properties and low temperature ductilities of compositions comprising a poly(ester-ether)copolymer, a polyester, and an antioxidant composition were studied in Examples 1-2, versus compositions comprising poly(ester-ether)copolymer, but no polyester (Comparative Example A). The compositions and results are shown in Table 2.

TABLE 2

| Component | Unit | Ex. 1 | Ex. 2 | CEx. A | CEx. B |
|---|---|---|---|---|---|
| Arnitel EM400 | wt. % | 84.6 | 72.1 | 100 | 84.6 |
| PBT-315 | wt. % | — | — | — | 15.0 |
| PET | wt. % | 15.0 | — | — | — |
| PCCD-low IV | wt. % | — | 27.5 | — | — |
| I 1010 | wt. % | 0.20 | 0.20 | — | 0.20 |
| 412S | wt. % | 0.20 | 0.20 | — | 0.20 |
| PTHF in TPEE copolymer | wt. % | 60 | 60 | 60 | 60 |
| Heat Aging, 70 hrs at 140° C. | visual | unchanged | sand color | cracked | sand color |
| Heat Aged Tensile Modulus | MPa | 74 | 186 | * | 83 |
| Heat Aged Stress at Maximum Strain | MPa | 19 | 15 | * | 6.3 |
| Heat Aged Elongation at Break | % | >300 | >300 | * | 35 |
| Compared to un-aged: <50% difference | — | pass | pass | fail | fail |
| Notched Izod, −40° C. | J/m | NB | NB | NB | 376 |
| Ductility, −40° C. | % | 100 | 100 | 100 | 100 |
| Shore D | — | 40 | 41 | 35 | 37 |
| Specific Gravity - ASTM D 792 | — | 1.15 | 1.13 | 1.11 | 1.14 |
| ASTM notched Izod, 23° C. | J/m | NB | NB | NB | NB |
| Ductility, 23° C. | % | 100 | 100 | 100 | 100 |
| Tensile Modulus | MPa | 89 | 218 | 50 | 67 |
| Elongation at Break | % | >300 | >300 | >300 | >300 |
| Vicat, 10N-50° C./h | ° C. | 141 | 147 | 140 | 150 |
| Vicat minus heat aging temperature | ° C. | 1 | 7 | 0 | 10 |

* Bars broke prior to test

The results in Table 2 demonstrate that Examples 1 and 2 show good flexibility as indicated by Shore D of 40 to 41. All compositions also show good low temperature ductility as indicated by 100% ductility at −40° C. Exs. 1 and 2 show good heat performance as indicated by passing the heat aging test of 70 hours at 140° C. However, Comparative Example A (with no polyester) and Comparative Example B (with PBT), failed the heat-aging test.

Examples 3-7 and Comparative Examples C-D

The formulations of Examples 3-7 comprise Hytrel 6356, an antioxidant composition, and 15% PBT-315, 15% PBT-195, 15% PBT-195 (repeat experiment), 40% PBT-315, 40% PCCD-low IV, and 27.5% PET, respectively. The compositions and results are shown in Table 3.

TABLE 3

| Component | Unit | Ex. 3 | Ex. 4 | Ex. 5 | Ex. 6 | Ex. 7 | CEx. C | CEx. D |
|---|---|---|---|---|---|---|---|---|
| Hytrel 6356 | wt. % | 84.6 | 84.6 | 84.6 | 59.6 | 59.6 | 100 | 72.1 |
| PBT-315 | wt. % | 15.0 | — | — | 40.0 | — | — | — |
| PBT-195 | wt. % | — | 15.0 | 15.0 | — | — | — | — |
| PET | wt. % | — | — | — | — | — | — | 27.5 |
| PCCD-low IV | wt. % | — | — | — | — | 40.0 | — | — |
| I 1010 | wt.% | 0.20 | 0.20 | 0.20 | 0.20 | 0.20 | — | 0.20 |
| 412S | wt.% | 0.20 | 0.20 | 0.20 | 0.20 | 0.20 | — | 0.20 |
| PTHF in TPEE copolymer | wt.% | 27 | 27 | 27 | 27 | 27 | 27 | 27 |
| Properties | | | | | | | | |
| Heat Aging, 70 hrs at 153° C. | visual | sand color | sand color | sand color | sand color | sand color | sand color | no change |
| Heat Aged Tensile Modulus | MPa | 631 | 646 | 673 | 1472 | 899 | 1260 | 1081 |
| Heat Aged Stress at Maximum Strain | MPa | 30 | 29 | 29 | 36 | 17 | 16 | 9 |
| Heat Aged Elongation at Break | % | 346 | 363 | 349 | 342 | 390 | 12 | 13 |
| Compared to un-aged: <50% difference | — | pass | pass | pass | pass | pass | fail | fail |
| ASTM notched Izod, −40° C. | J/m | 164 | 111 | 139 | 73.9 | 44.6 | 157 | 100 |
| Ductility, −40° C. | % | 0 | 0 | 0 | 0 | 0 | 0 | 0 |
| Shore D | — | 59 | 57 | 57 | 62 | 60 | 63 | 60 |
| Specific Gravity | — | 1.23 | 1.24 | 1.24 | 1.26 | 1.20 | — | 1.27 |
| Notched Izod, 23° C. | J/m | 764 | 798 | 797 | 266 | 916 | NB | 654 |
| Ductility, 23° C. | % | 100 | 100 | 100 | 40 | 100 | 100 | 80 |
| Tensile Modulus | MPa | 569 | | 601 | 1388 | 794 | 318 | 1151 |

TABLE 3-continued

| Component | Unit | Ex. 3 | Ex. 4 | Ex. 5 | Ex. 6 | Ex. 7 | CEx. C | CEx. D |
|---|---|---|---|---|---|---|---|---|
| Elongation at Break | % | >300 | >300 | >300 | >300 | >300 | >300 | 29 |
| Vicat, 10N-50° C./h | ° C. | 198 | 199 | 200 | 213 | 193 | 198 | 198 |
| Vicat minus heat aging temperature | ° C. | 45 | 46 | 47 | 60 | 40 | 45 | 45 |

As can be seen from the data in Table 3, Examples 3-7 all demonstrate good flexibility as indicated by Shore D in the range of 57 to 62. All compositions also show good ductility at room temperature (23° C.). Examples 3-7 further show good heat performance as indicated by passing the heat aging test of 70 hours at 153° C. However, Comparative Example C (no polyester) fails heat aging test, as well as Comparative Example D, which contains 27.5% PET.

The results in Tables 2 and 3 indicate that an improvement in heat aging is obtained for TPEE materials with a PTHF content ranging from 27 to 60% by adding specific amounts of PCCD, PET, or PBT.

Also, within this range of compositions, there appears to be a compositional area where superior heat aging is combined with 100% ductility in Izod impact at −40° C. Examples 1 and 2 in Table 2 demonstrate this combination of properties, but Examples 3-7 in Table 3 do not.

For this reason, additional experiments were performed using TPEE elastomers with PTHF level in between that of the TPEE materials used in the above examples.

Example 8 and Comparative Examples E-F

The composition of Example 8, which contains a poly(ester-ether) copolymer, 15 wt. % of PET, and an antioxidant package, was compared to compositions comprising polyester-ether) copolymer, but no polyester (Comparative Examples E-F). The composition of Example 8 contains Hytrel 4056 (45 wt. % PTHF). Comparative Ex. E and F contain Hytrel 4056 and Hytrel 4556, respectively (45 wt. % and 50 wt. % PTHF, respectively). The compositions and results are shown in Table 4.

TABLE 4

| Component | Unit | Ex. 8 | CEx. E | CEx. F |
|---|---|---|---|---|
| Hytrel 4056 | wt. % | 84.6 | 100 | — |
| Hytrel 4556 | wt. % | — | — | 100 |
| PET | wt. % | 15.0 | — | — |
| I 1010 | wt. % | 0.20 | — | — |
| 412S | wt. % | 0.20 | — | — |
| PTHF in TPEE copolymer | wt. % | 45 | 45 | 50 |
| Properties | | | | |
| Heat Aging, 70 hrs at 153° C. | visual | brown | tan color | cracks |
| Heat Aged Tensile Modulus | MPa | 106 | 61 | 93 |
| Heat Aged Stress at Maximum Strain | MPa | 10.9 | 2.1 | 1.4 |
| Heat Aged Elongation at Break | % | 279 | 30 | 58 |
| Compared to un-aged: <50% difference | — | pass | fail | fail |
| ASTM notched Izod at −40° C. | J/m | NB | NB | NB |
| Ductility at −40° C. | % | 100 | 100 | 100 |
| Shore D | — | 43 | 40 | 45 |
| Specific Gravity | — | 1.19 | 1.17 | 1.14 |
| Notched Izod at 23° C. | J/m | 271 | NB | NB |
| Ductility at 23° C. | % | 100 | 100 | 100 |
| Tensile Modulus | MPa | 139 | 65 | 85 |
| Stress at Maximum Strain | MPa | 13.4 | 9.5 | 13.1 |
| Elongation at Break | % | >300 | >300 | >300 |
| Vicat, 10N-50° C./h | ° C. | 112 | 110 | 158 |
| Vicat minus heat aging temperature | ° C. | −41 | −43 | 5 |

Results in Table 4 show that all three materials have 100% ductility in the Izod impact test at −40° C. However, while Ex. 8 passes the heat-aging test, both comparative Examples fail.

Examples 9-12 and Comparative Examples G-I

More compositions were studied to determine desirable compositions and compositional ranges that can provide the combination of low temperature ductility and/or heat aging resistance. Compositions of Ex. 11-17 comprise a poly(ester-ether)copolymer, a polyester, and an antioxidant composition. The compositions and results are shown in Table 5.

TABLE 5

| Component | Unit | Ex. 9 | Ex. 10 | Ex. 11 | Ex. 12 | CE. G | CEx. H | CEx. I |
|---|---|---|---|---|---|---|---|---|
| Hytrel 4056 | wt. % | 72.1 | 84.6 | 84.6 | 84.6 | 59.6 | 59.6 | 59.6 |
| PBT-195 | wt. % | — | — | — | — | 40.0 | — | — |
| PBT-315 | wt. % | 27.5 | — | — | — | — | — | — |
| PCCD-low IV | wt. % | — | 15.0 | — | — | — | — | — |
| PCCD-high IV | wt. % | — | — | 15.0 | 15.0 | — | 40.0 | 40.0 |
| I 1010 | wt. % | 0.20 | 0.20 | 0.20 | 0.20 | 0.20 | 0.20 | 0.20 |
| 412S | wt. % | 0.20 | 0.20 | 0.20 | 0.20 | 0.20 | 0.20 | 0.20 |
| PTHF in TPEE copolymer | wt. % | 45 | 45 | 45 | 45 | 45 | 45 | 45 |
| Properties | | | | | | | | |
| Heat Aging, 70 hrs at 153° C. | visual | sand color | brown color | brown color | brown color | sand color | brown color | brown color |
| Heat Aged Tensile Modulus | MPa | 306 | 61 | 67 | 64 | 1094 | 207 | 213 |
| Heat Aged Stress at Maximum Strain | MPa | 20.4 | 12.2 | 8.8 | 8.8 | 8.4 | 18.2 | 17.7 |
| Heat Aged | % | 335 | 319 | 292 | 220 | 220 | 332 | 316 |

TABLE 5-continued

| Component | Unit | Ex. 9 | Ex. 10 | Ex. 11 | Ex. 12 | CE. G | CEx. H | CEx. I |
|---|---|---|---|---|---|---|---|---|
| Elongation at Break Compared to un-aged: <50% difference | — | pass | pass | pass | pass | pass | fail | fail |
| Notched Izod at –40° C. | J/m | NB | NB | NB | NB | 464 | 846 | 336 |
| Ductility, –40° C. | % | 100 | 100 | 100 | 100 | 40 | 80 | 40 |
| Shore D | — | 46 | 39 | 40 | 39 | 53 | 45 | 45 |
| Specific Gravity | — | 1.19 | 1.15 | 1.15 | 1.16 | 1.21 | 1.16 | 1.16 |
| Notched Izod, 23° C. | J/m | NB | 221 | NB | NB | 710 | NB | 368 |
| % ductility, 23° C. | % | 100 | 100 | 100 | 100 | 100 | 100 | 100 |
| Tensile Modulus | MPa | 238 | 90 | 81 | 80 | 1154 | 94 | 134 |
| Elongation at break | % | >300 | >300 | >300 | >300 | >300 | >300 | >300 |
| Vicat, 10N-50° C./h | ° C. | 124 | 107 | 109 | 106 | 147 | 121 | 116 |
| Vicat minus heat aging temperature | ° C. | –29 | –46 | –45 | –47 | –6 | –33 | –37 |

Examples 9-11 are blends of various polyesters with Hytrel 4056 and an antioxidant composition. As can be seen from Table 5, these three examples demonstrate that in addition to PET as shown in Example 8 (Table 4), PBT and PCCD also result in blends that have a combination of flexibility, low temperature ductility, and heat aging resistance.

Examples 10-11 in Table 5 show that the viscosity of the polyester is not a significant factor in obtaining the favorable combination of properties. Example 12 is a reproduction of Ex. 11, and a comparison of the test results indicates that the properties are very similar, showing that the obtained properties are reproducible.

Comparative Examples G-J have higher polyester contents than used in the Examples of 9-12. None of the Comparative Examples G-I shows the favorable combination of properties obtained with Examples 9-12. Comparative Ex. G only has 40% ductility at –40° C. Comparative Ex. H and its repeat Ex. I show only 80% and 40% ductility at –40° C., respectively, and both fail the heat aging test, as the tensile modulus of the heat aged parts increases more than 50% compared to the value of the un-aged material. These comparative examples suggest that the more preferred polyester level in the composition is less than 40%.

Examples 13-14 and Comparative Examples J-K

The following compositions were studied to determine the optimal PTHF level and the effect of terephthalate/isophthalate ratio. The compositions and results are shown in Table 6.

TABLE 6

| Component | Unit | Ex. 13 | Ex. 14 | CEx. J | CEx. K |
|---|---|---|---|---|---|
| Hytrel 4556 | wt. % | 74.90 | 37.45 | 74.90 | 74.90 |
| Hytrel 4056 | wt. % | — | 37.45 | — | — |
| PBT-195 | wt. % | 24.95 | 24.95 | — | — |
| PET | wt. % | — | — | 24.95 | — |
| PCCD-Low IV | wt. % | — | — | — | 24.95 |
| PEPQ | wt.% | 0.10 | 0.10 | 0.10 | 0.10 |
| Phosphoric Acid pre-diluted to 10% | wt.% | 0.05 | 0.05 | 0.05 | 0.05 |
| PTHF in TPEE copolymer | wt.% | 50 | 48 | 50 | 50 |
| Properties Heat aging, 70 hrs at 153° C. | | | | | |
| Heat Aged Tensile Modulus | MPa | 707 | 81 | 396 | 236 |
| Heat Aged Stress at Maximum Strain | MPa | 21 | 12 | 12 | 13 |
| Heat Aged Elongation at Break | % | 331 | 200 | 13 | 174 |
| Compared to un-aged: <50% difference | — | pass | pass | fail | fail |
| Notched Izod at –40° C. | J/m | 1080 | 748 | 875 | 824 |
| Ductility at –40° C. | % | 100 | 100 | 100 | 80 |
| Shore D | — | 50 | 39 | 49 | 46 |
| Specific Gravity | — | | | | |
| Notched Izod at 23° C. | J/m | 530 | 220 | 448 | 405 |
| Ductility at 23° C. | % | 100 | 100 | 100 | 100 |
| Tensile Modulus | MPa | 591 | 78 | 275 | 154 |
| Stress at Maximum Strain | MPa | 20.7 | 12.3 | 20.7 | 14.9 |
| Elongation at Break | % | >300 | >300 | >300 | >300 |
| Vicat, 10N-50° C./h | ° C. | 172 | 144 | 165 | 160 |
| Vicat minus heat aging temperature | ° C. | 19 | –9 | 12 | 7 |

Results in Table 6 demonstrate that for PBT blends a desirable combination of properties is obtained using thermoplastic poly(ether-ester)s with a PTHF level between 27 and 60%, independent of the terephthalate/isophthalate ratio in the TPEE copolymer(s) of the blend (Examples 13 and 14). In Example 13, the terephthalate/isophthalate ratio in the TPEE copolymer is 100/0 (see Table 1). In Example 14, the terephthalate/isophthalate ratio in the TPEE copolymers is 94/6 (a 50/50 mixture of Hytrel 4556 and Hytrel 4056), and in Example 10 (see Table 5) the terephthalate/isophthalate ratio in the TPEE copolymer is 78/22. In all three of these examples, 100% ductility at –40° C. in combination with passing the heat-aging test is obtained.

On the other hand, as shown in Comparative Examples J-K, for blends containing PET or PCCD, a desirable combination of properties is not obtained using thermoplastic poly(ether-ester)s with a PTHF level between 27 and 60%, independent of the terephthalate/isophthalate ratio in the TPEE copolymer. In Comparative Examples J and K, the terephthalate/isophthalate ratio in the TPEE copolymer 100/0, whereas in Examples 8-12, the terephthalate/isophthalate ratio in the TPEE copolymer is 78/22. Only in the presence of a terephthalate/isophthalate ratio in the TPEE copolymer of less than 100/0 is the desirable combination of 100% ductility at –40° C. and passing the heat aging test obtained.

Examples 15-22

The effect of varying stabilizer combinations on the low temperature ductility and heat aging resistance was also studied. The compositions and results are shown in Table 7.

TABLE 7

| Component | Unit | Ex. 15 | Ex. 16 | Ex. 17 | Ex. 18 | Ex. 19 | Ex. 20 | Ex. 21 | Ex. 22 |
|---|---|---|---|---|---|---|---|---|---|
| Hytrel 4056 | wt. % | 84.4 | 83.5 | 83.1 | 83.1 | 72 | 71.3 | 70.9 | 70.9 |
| PET | wt. % | 14.9 | 14.8 | 14.7 | 14.7 | — | — | — | — |
| PBT-315 | wt. % | — | — | — | — | 27.3 | 27 | 26.9 | 26.9 |
| Irganox 1010 | wt. % | 0.2 | — | — | — | 0.2 | — | — | — |
| 412S | wt. % | 0.2 | 0.3 | 0.3 | 0.3 | 0.2 | 0.3 | 0.3 | 0.3 |
| Naugard 445 | wt. % | — | 0.3 | 0.3 | 0.3 | — | 0.3 | 0.3 | 0.3 |
| Ultranox 626 | wt. % | — | 0.3 | 0.3 | 0.3 | — | 0.3 | 0.3 | 0.3 |
| ADR 4368 | wt. % | — | 0.5 | — | — | — | 0.5 | — | — |
| Sodium Stearate | wt. % | — | — | 0.05 | 0.05 | — | — | 0.05 | 0.05 |
| Cycloaliphatic Epoxy Resin | wt. % | — | — | 1 | — | — | — | 1 | — |
| Epoxy silane | wt. % | — | — | — | 1 | — | — | — | 1 |
| Pentaerythritol tetrastearate | wt.% | 0.3 | 0.3 | 0.3 | 0.3 | 0.3 | 0.3 | 0.3 | 0.3 |
| PTHF in TPEE copolymer | wt.% | 45 | 45 | 45 | 45 | 45 | 45 | 45 | 45 |
| Properties Heat aging, 4 weeks at 140° C. | | | | | | | | | |
| Heat Aged Tensile Modulus | MPa | broke prior to test | 96 | 106 | 83 | 375 | 394 | 419 | 567 |
| Heat Aged Stress at Maximum Strain | MPa | broke prior to test | 12 | 11 | 10 | 14 | 16 | 15 | 17 |
| Heat Aged Elongation at Break | % | broke prior to test | 280 | 300 | 190 | 160 | 190 | 180 | 280 |
| Compared to un-aged: <50% difference | — | fail | pass | pass | pass | pass | pass | pass | pass |
| Notched Izod at −40° C. | J/m | 400 | 369 | 371 | 455 | 452 | 363 | 417 | 549 |
| Ductility at −40° C. | % | 100 | 100 | 100 | 100 | 100 | 100 | 100 | 100 |
| Shore D | — | 43 | 42 | 42 | 41 | 45 | 44 | 44 | 44 |
| ASTM notched Izod at 23° C. | J/m | — | 212 | 193 | 183 | 301 | 305 | 321 | 327 |
| ductility at 23° C. | % | — | 100 | 100 | 100 | 100 | 100 | 100 | 100 |
| Vicat, 10N-50° C./h | ° C. | — | 115 | 113 | 111 | 125 | 124 | 123 | 127 |
| Tensile Modulus | MPa | 106 | 109 | 129 | 105 | 328 | 332 | 343 | 432 |
| Stress at Maximum Strain | MPa | 10.9 | 13.9 | 13.4 | 12.8 | 17.6 | 19.8 | 17.9 | 18.7 |
| Elongation at Break | % | >300 | >300 | >300 | >300 | >300 | >300 | >300 | >300 |

Table 7 demonstrates the effects of varying stabilizer combinations on compositions falling with the compositional range disclosed herein. In this set of experiments, the heat aging was performed for 4 weeks at 140° C.

While in all cases the Izod impact strength at −40° C. is 100% ductile, improvements can be made in the maximum strain by using stabilizer combinations containing multiple antioxidants, an epoxy-containing additive, and a catalyst.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition having improved heat aging consisting of a blend of:
   10 to 45 weight percent of a polyester selected from the group consisting of poly(ethylene terephthalate), poly(butylene terephthalate), poly(1,4-cyclohexyldimethylene cyclohexyl dicarboxylate), or a combination comprising at least one of the foregoing; and
   55 to 90 weight percent of a poly(ester-ether) copolymer, each based on the total weight of the polyester and the poly(ester-ether) copolymer;
   wherein the poly(ester-ether) copolymer comprises
   units derived from terephthalic or a chemical equivalent thereof,
   units derived from butane diol or a chemical equivalent thereof, and
   25 to 65 weight percent of units derived from poly(oxytetramethylene)glycol, based on the weight of the copolymer;
   optionally additives selected from the group consisting of antioxidants, flame retardants, light stabilizers, plasticizers, lubricants, antistatic agents, colorants, mold release agents, fillers, aromatic polycarbonates, polysulfones, polyethersulfones, and impact modifiers;
   wherein the elongation at break of the composition is larger than 150% after being exposed to a temperature of 140° C. for 4 weeks, as measured by ASTM D-638, and
   0.1 to 5 weight percent of a carboxy reactive component consisting of an epoxide, based on the total weight of the composition, and
   optionally a catalyst that, if present, is selected from the group consisting of a hydroxide, hydride, amide, carbonate, phosphate, $C_{2-36}$ carboxylate, $C_{2-18}$ enolate, a $C_{2-36}$ dicarboxylate of an alkali metal, alkaline earth metal, or other metal; or a Lewis catalyst selected from the group consisting of a tin or titanium compound, a nitrogen-containing compound, a $C_{1-36}$ tetraalkyl phosphonium hydroxide or acetate; or an alkali or alkaline earth metal salt of a negatively charged polymer, and combinations thereof, exclusive of borate or other catalysts.

2. The composition of claim 1, wherein the carboxy reactive component is a compound having a terminal epoxy group, a cycloaliphatic epoxy resin, or a combination comprising at least one of the foregoing.

3. The composition of claim 1, wherein the carboxy reactive component comprises a terminal epoxy cycloaliphatic group and a terminal silane group.

4. The composition of claim 1, wherein the carboxy reactive component is a beta-(3,4-epoxycyclohexyl)ethyl triethoxysilane, an epoxy resin based on bisphenol A, or a combination comprising at least one of the foregoing.

5. The composition of claim 1 wherein the carboxy reactive component is an epoxy-containing compound, and wherein the composition further comprises:
  a catalyst to catalyze the reaction between the carboxy reactive component and the polyester; and
  multiple antioxidant stabilizers selected from the group consisting of a hindered diol stabilizer, a thioester stabilizer, an amine stabilizer, a phosphite stabilizer, or a combination comprising at least one of the foregoing stabilizers.

6. The composition of claim 1 wherein the poly(ester-ether) copolymer comprises hard blocks and soft blocks in which the $T_g$ of the soft blocks is 0 to $-85°$ C. and the $T_m$ of the hard blocks is 120-211° C.

7. The composition of claim 6 wherein the poly(ester-ether) copolymer comprises hard blocks and soft blocks in which the $T_g$ of the soft blocks is $-45$ to $-65°$ C. and the $T_m$ of the hard blocks is 150-195° C.

8. The composition of claim 1, wherein the composition retains at least 50% of tensile modulus and stress at maximum strain, and retains at least 50% of the elongation at break and after being exposed to a temperature of 140° C. for 2 weeks, as measured by ASTM D-638.

9. The composition of claim 1, wherein the polyester is poly(ethylene terephthalate), and wherein the poly(ethylene terephthalate) is present in an amount of 10 to 20 weight percent based on the total weight of the polyester and the poly(ester-ether)copolymer.

10. The composition of claim 1, wherein the polyester is poly(1,4-cyclohexyldimethylene cyclohexyl dicarboxylate), wherein the amount of the poly(1,4-cyclohexyldimethylene cyclohexyl dicarboxylate) is present in an amount of 26 to 45 weight percent, based on the total weight of the polyester and the poly(ester-ether) copolymer; and wherein the poly(ester-ether) copolymer further comprises units derived from isophthalic acid or a chemical equivalent thereof, in an amount of less than 5 mole percent of the total moles of terephthalate and isophthalate units in the poly(ester-ether) copolymer.

11. The composition of claim 1, wherein the polyester is poly(1,4-cyclohexyldimethylene cyclohexyl dicarboxylate), wherein the amount of the poly(1,4-cyclohexyldimethylene cyclohexyl dicarboxylate) is 10 to 35 weight percent, based on the total weight of the polyester and the poly(ester-ether) copolymer, and wherein the poly(ester-ether) copolymer further comprises units derived from isophthalic acid or a chemical equivalent thereof, in an amount of more than 5 mole percent of the total moles of terephthalate and isophthalate units in the poly(ester-ether) copolymer.

12. The composition of claim 1, having a notched Izod percent ductility within 10 percent of the notched Izod ductility of the same composition without the polyester, each measured in accordance with ASTM D256 at $-40°$ C.

13. The composition of claim 1, having a Shore D of greater than or equal to 39.

14. The composition of claim 1, wherein the amount of the isophthalic acid in the poly(ester-ether) copolymer is less than 40 mole percent of the total moles of units derived from terephthalic acid and isophthalic acid in the poly(ester-ether) copolymer.

15. The composition of claim 1, wherein the composition consists of said components and optionally other polymers, oxidants, flame retardants, light stablilizers, plasticizers, lubricants, antistatic agents, colorants, mold release agents, and/or fillers.

16. The composition of claim 1, wherein the composition does not further comprise heat stabilizers.

* * * * *